(12) United States Patent
Jin et al.

(10) Patent No.: US 11,385,735 B2
(45) Date of Patent: Jul. 12, 2022

(54) IN-CELL TOUCH-TYPE DISPLAY PANEL (71) Applicant: LG Display Co., Ltd., Seoul (KR)

(72) Inventors: Hye-Jung Jin, Busan (KR); Soo-Young Choi, Gumi-si (KR); Sun-Yong Lee, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/123,473

(22) Filed: Dec. 16, 2020

(65) Prior Publication Data

US 2021/0191557 A1 Jun. 24, 2021

(30) Foreign Application Priority Data

Dec. 17, 2019 (KR) .......................... 10-2019-0168909

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05)

(58) Field of Classification Search
None
See application file for complete search history.

(56) References Cited

U.S. PATENT DOCUMENTS

2017/0205656 A1* 7/2017 Lee .................... G02F 1/136286
2018/0329544 A1* 11/2018 Yeh ........................ G06F 3/0443

* cited by examiner

*Primary Examiner* — Duane N Taylor, Jr.
(74) *Attorney, Agent, or Firm* — Polsinelli PC (57) ABSTRACT

An in-cell touch-type display panel includes an array substrate divided into a display area, a bezel area, and a pad area, gate lines, data lines and touch lines disposed in the display area of the array substrate, a data pad and a touch pad disposed in the pad area of the array substrate, and data link lines connecting the data lines to the data pad and the size of a bezel can be reduced by applying a dual link to data link lines using gate line metal and data line metal.

13 Claims, 7 Drawing Sheets

IN-CELL TOUCH-TYPE DISPLAY PANEL

CROSS-REFERENCE TO RELATED APPLICATION

This application claims the benefit of Korean Patent Application No. 10-2019-0168909, filed on Dec. 17, 2019, which is hereby incorporated by reference in its entirety.

BACKGROUND

Field of the Disclosure

The present disclosure relates to a display panel, and more particularly to an in-cell touch-type display panel having a narrow bezel.

Description of the Background

With the development of information-oriented society and various portable electronic devices such as mobile communication terminals or laptop computers, the demand for flat panel display devices applicable to portable electronic devices is gradually increased.

As a flat panel display device, a liquid crystal display (LCD) device using a liquid crystal and an organic light-emitting diode (OLED) display device using an OLED are used.

Such a flat panel display device is composed of a display panel, which includes a plurality of gate lines and a plurality of data lines in order to display an image, and a driving circuit for driving the display panel.

Among the aforementioned display devices, a display panel of the LCD device includes a thin-film transistor array substrate having a thin-film transistor array formed on a first glass substrate, a color filter array substrate having a color filter array formed on a second glass substrate, and a liquid crystal layer interposed between the thin-film transistor array substrate and the color filter array substrate.

The thin-film transistor array substrate includes a plurality of gate lines GL extending in a first direction and a plurality of data lines DL extending in a second direction perpendicular to the first direction, and subpixel regions (pixels: P) are defined by each gate line and each data line. A thin-film transistor and a pixel electrode are formed in each subpixel region P.

The display panel of the LCD device displays an image by applying a voltage to electric field generation electrodes (a pixel electrode and a common electrode) to generate an electric field in the liquid crystal layer and adjusting the state of arrangement of liquid crystal molecules in the liquid crystal layer through the electric field to control the polarization of incident light.

In addition, among the aforementioned display devices, a display panel of the OLED display device includes subpixels defined at the intersection of a plurality of gate lines and a plurality of data lines, and each subpixel includes an OLED, which is composed of an anode, a cathode and an organic emission layer interposed between the anode and the cathode, and a pixel circuit for independently driving the OLED.

The pixel circuit may be formed in any of various configurations. For example, the pixel circuit includes at least one switching thin-film transistor (TFT), a capacitor, and a driving TFT.

The at least one switching TFT charges a data voltage in the capacitor in response to a scan pulse. The driving TFT controls the quantity of current supplied to the OLED in response to the data voltage charged in the capacitor to adjust the quantity of light emitted from the OLED.

The flat panel display device is applied to various appliances such as TVs, projectors, mobile phones, and personal digital assistants (PDAs). Recently developed appliances are not equipped with a separate input device, but have a touch function to enable data input by touching a screen. A display device having a touch function is referred to as an in-cell touch-type display device.

In order to perform a touch-sensing function, in addition to components of a general display device, e.g. gate lines and data lines, an array substrate for an in-cell touch-type display panel further includes a plurality of touch blocks to sense a touch made by a user and touch lines connected to the touch blocks.

Such an array substrate for an in-cell touch-type display panel includes a thin-film transistor in which low-temperature polycrystalline silicon (LTPS) having excellent mobility is used as a semiconductor layer. This LTPS array substrate is generally manufactured through eleven mask processes.

The array substrate for an in-cell touch-type display panel is provided with a gate insulating film, an interlayer insulating film, an auxiliary insulating layer, and first to fourth protective layers as insulating layers.

A method of manufacturing an in-cell touch-type display panel through eight mask processes by omitting some of the aforementioned insulating layers has recently been developed.

In order to manufacture an in-cell touch-type display panel through eight mask processes, data lines and touch lines are formed of the same material in the same layer in a display area, data link lines for connecting the display area to a pad area are formed of a gate line material, and touch link lines are formed of a data line material.

However, since there is a limitation to the extent to which the pitch at which a metal layer is processed to form data link lines can be reduced, there is a limitation to the extent to which the size of a bezel of an in-cell touch-type display panel can be reduced.

SUMMARY

Accordingly, the present disclosure is directed to an in-cell touch-type display panel that substantially obviates one or more problems due to limitations and disadvantages of the related art.

In addition, the present disclosure is to provide an in-cell touch-type display panel having a reduced bezel by applying a dual link to data link lines using gate line metal and data line metal.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, an in-cell touch-type display panel may include a first substrate divided into a display area, a bezel area, and a pad area; gate lines, data lines and touch lines disposed in the display area of the first substrate; a data pad and a touch pad disposed in the pad area of the first substrate; and data link lines connecting the data lines to the data pad. The data link lines may include a first link line of odd-numbered data link lines disposed in the bezel area of the first substrate and formed of a same material as the gate lines so as to be connected to the data lines; a second link line of the odd-numbered data link lines disposed in the bezel area of the first substrate and formed of a same material as the data lines so as to be connected to the first link line of the odd-numbered data link lines and the data pad; a first link line of even-numbered data link lines disposed in the bezel area of the first substrate and formed of the same material as the data lines so as to be connected to the data lines; and a second link line of the even-numbered data link lines disposed in the bezel area of the first substrate and formed of the same material as the gate lines so as to be connected to the first link line of the even-numbered data link lines and the data pad.

The in-cell touch-type display panel may further include a third link line disposed in the bezel area of the first substrate and disposed on the same layer as the touch lines and formed of the same material as the touch lines so as to be connected to the touch lines and the touch pad.

The data pad may be disposed on a same layer as the data lines and formed of the same material as the data lines.

The touch pad may be disposed on the same layer as the gate lines and formed of the same material as the gate lines.

In another aspect of the present disclosure, an in-cell touch-type display panel may include a gate insulating film disposed on an entire surface of a first substrate divided into a display area, a bezel area, and a pad area; gate lines disposed on the gate insulating film in the display area, a first link line of odd-numbered data link lines disposed on the gate insulating film in the bezel area, a second link line of even-numbered data link lines disposed on the gate insulating film in the bezel area, and a touch pad disposed on the gate insulating film in the pad area; an interlayer insulating film disposed on the gate insulating film having the gate lines, the first link line of the odd-numbered data link lines, the second link line of the even-numbered data link lines, and the touch pad; odd-numbered data lines disposed on the interlayer insulating film in the display area and electrically connected to the first link line of the odd-numbered data link lines, even-numbered data lines disposed on the interlayer insulating film in the display area, a second link line of the odd-numbered data link lines disposed on the interlayer insulating film in the bezel area and electrically connected to the first link line of the odd-numbered data link lines, a first link line of the even-numbered data link lines disposed on the interlayer insulating film in the bezel area and electrically connected to the even-numbered data lines, an odd-numbered data pad disposed on the interlayer insulating film in the pad area and electrically connected to the second link line of the odd-numbered data link lines, and an even-numbered data pad disposed on the interlayer insulating film in the pad area and electrically connected to the second link line of the even-numbered data link lines; and a protective film disposed on the interlayer insulating film having the odd-numbered data lines, the even-numbered data lines, the second link line of the odd-numbered data link lines, the first link line of the even-numbered data link lines, the odd-numbered data pad, and the even-numbered data pad.

The first link line of the odd-numbered data link lines, the second link line of the even-numbered data link lines, and the touch pad may be formed of the same material as the gate lines.

The second link line of the odd-numbered data link lines, the first link line of the even-numbered data link lines, the odd-numbered data pad, and the even-numbered data pad may be formed of the same material as the data lines.

The in-cell touch-type display panel may further include touch lines disposed on the protective film in the display area, and a third link line disposed on the protective film in the bezel area and configured to electrically connect the touch lines to the touch pad.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate aspect(s) of the disclosure and together with the description serve to explain the principle of the disclosure.

In the drawings.

DETAILED DESCRIPTION

Hereinafter, exemplary aspects of the present disclosure will be described with reference to the accompanying drawings.

Wherever possible, the same reference numbers will be used throughout the drawings to refer to the same or like parts. In addition, in the following description of the aspects, a detailed description of known functions and configurations incorporated herein will be omitted when it may make the subject matter of the present disclosure rather unclear.

Additionally, terms such as "first", "second", "A", "B", "(a)", "(b)", etc. may be used herein to describe the components of the aspects. These terms are only used to distinguish one element from another element, and the essence, order, or sequence of the corresponding elements is not limited by these terms. It should be noted that when it is described in the specification that one component is "connected", "coupled", or "joined" to another component, the former may be directly "connected", "coupled", or "joined" to the latter, intervening components may be present, or the former may be indirectly "connected", "coupled", or "joined" to the latter via yet another component.

Furthermore, a display panel according to the present disclosure may include a liquid crystal display panel or an organic light-emitting diode display panel.

Figure 1:
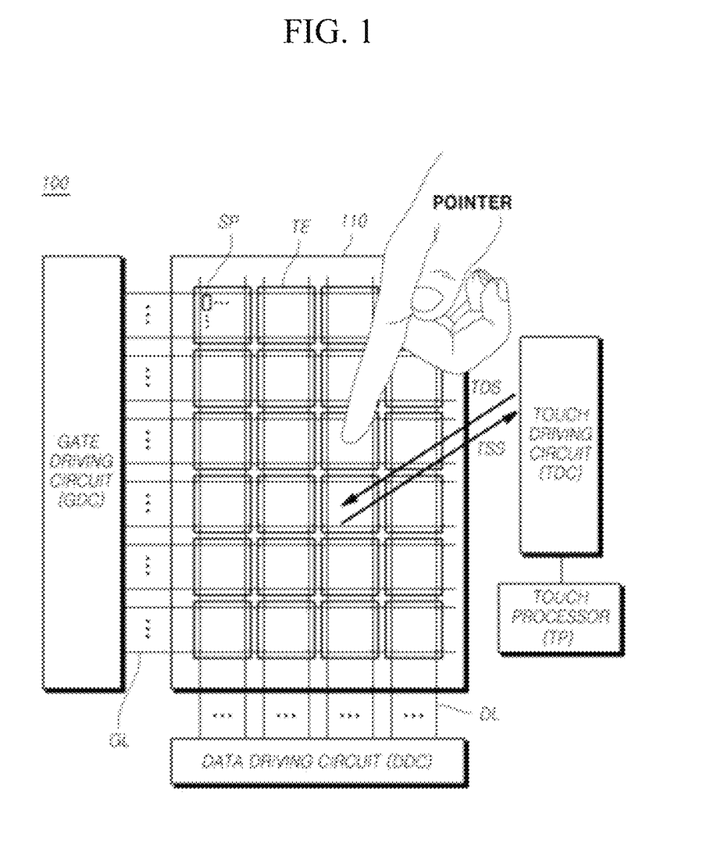
FIG. 1 is a diagram of a system of an in-cell touch-type display device according to an aspect of the present disclosure.

FIG. 1 is a diagram of a system of an in-cell touch-type display device according to an aspect of the present disclosure.

As shown in FIG. 1, an in-cell touch-type display device 100 according to the present disclosure may include a display panel 110 and various circuits.

The in-cell touch-type display device 100 according to the present disclosure may perform a display function to display an image and a touch function to sense a touch made by a finger, a pointer such as a stylus, or the like.

The in-cell touch-type display device 100 according to the present disclosure may operate in a display mode to perform the display function during a display mode period or in a touch mode to perform the touch function during a touch mode period. The display mode period and the touch mode period may be divided on a temporal basis, or may be simultaneous within the same period of time.

That is, the display-mode operation for displaying an image and the touch-mode operation for sensing a touch may be performed separately or simultaneously.

In the display panel 110 of the in-cell touch-type display device 100 according to the present disclosure, a plurality of data lines DL and a plurality of gate lines GL may be disposed to display an image, and a plurality of subpixels SP defined by the data lines DL and the gate lines GL may be disposed.

In addition, in the display panel 110, a plurality of touch electrodes TE, which serve as touch sensors for sensing a touch, may be disposed.

The in-cell touch-type display device 100 according to the present disclosure may include a data-driving circuit DDC and a gate-driving circuit GDC in order to drive the display panel 110 during the display mode period, and may further include at least one controller to control the operation timing of the data-driving circuit DDC and the gate-driving circuit GDC or the supply of power thereto.

The in-cell touch-type display device 100 according to the present disclosure may include a touch-driving circuit TDC to drive a plurality of touch electrodes TE of the display panel 110 during the touch mode period and a touch processor TP to determine the presence or absence of a touch and/or a touched position based on signals received from the touch electrodes TE to which touch-driving signals TDS are applied during the touch mode period.

The touch-driving circuit TDC may supply touch-driving signals TDS to the touch electrodes TE in order to drive the touch electrodes TE, and may receive touch-sensing signals TSS from the touch electrodes TE to which the touch-driving signals TDS are supplied.

The touch-driving circuit TDC may transmit the received touch-sensing signals TSS or sensing data obtained by processing the received touch-sensing signals TSS to the touch processor TP. The touch processor TP may execute a touch algorithm using the touch-sensing signals TSS or the sensing data, and may determine the presence or absence of a touch and/or a touched position through the same.

Figure 2:
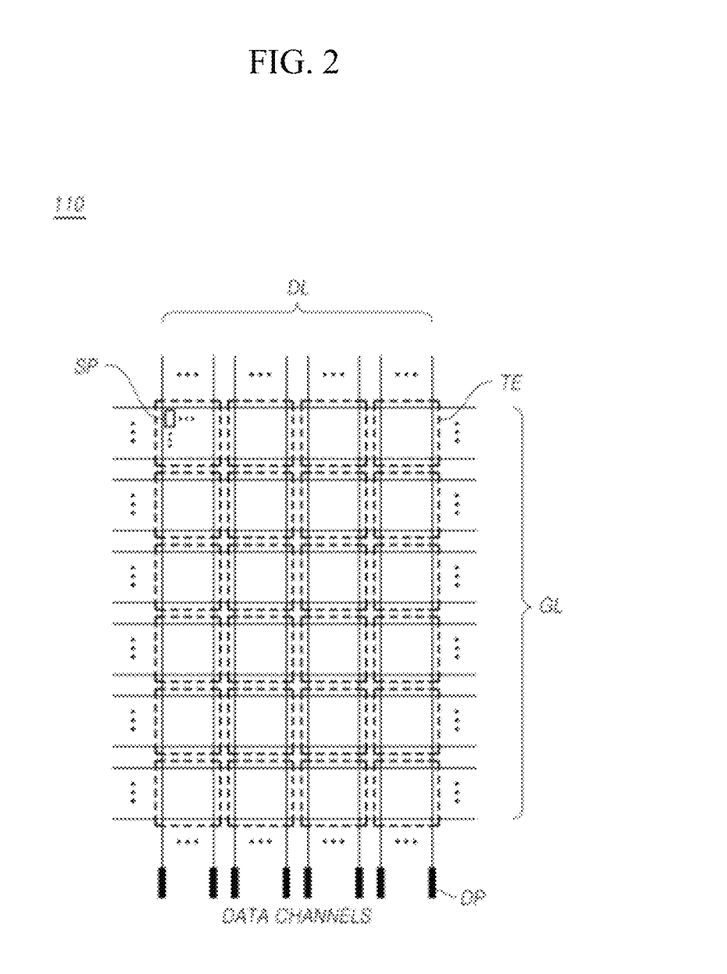
FIG. 2 is a diagram showing the display driving configuration of a display panel according to an aspect of the present disclosure.
Figure 3:
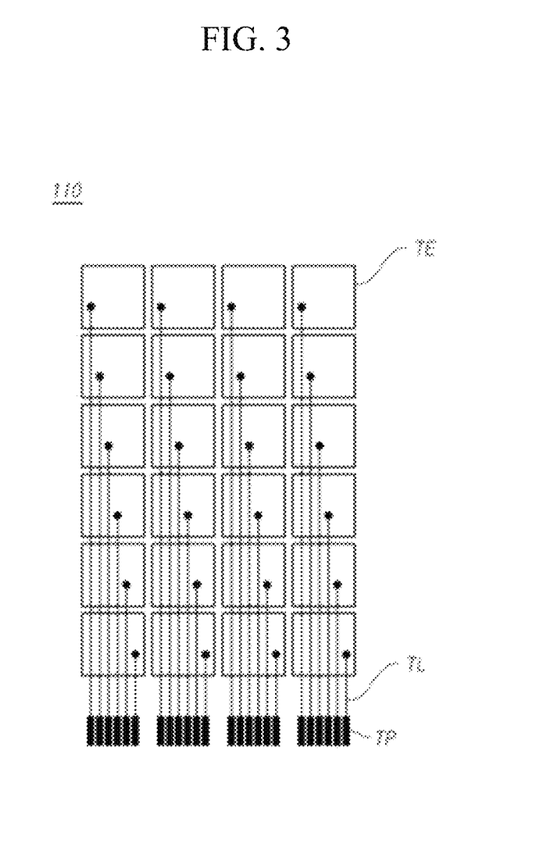
FIG. 3 is a diagram showing the touch driving configuration of the display panel according to the aspect of the present disclosure.

FIG. 2 is a diagram showing the display driving configuration of the display panel 110 according to the aspect of the present disclosure, and FIG. 3 is a diagram showing the touch driving configuration of the display panel 110 according to the aspect of the present disclosure.

Referring to FIG. 2, in the display panel 110 according to the aspect of the present disclosure, a plurality of data lines DL and a plurality of gate lines GL are disposed in order to perform the display driving, and a plurality of subpixels SP defined by the data lines DL and the gate lines GL is disposed.

Each of the data lines DL receives an image data voltage VDATA for displaying an image from the data-driving circuit DDC. Thus, a configuration for electrically connecting each of the data lines DL to a corresponding one of data channels (a point from which a corresponding data voltage is output) of the data-driving circuit DDC is required. In this regard, the data-driving circuit DDC may be of a chip-on-film (COF) type or a chip-on-glass (COG) type, and may be electrically connected to a pad region present in a non-display area of the display panel 110.

Thus, a plurality of data pads DP is disposed in the pad region present in the non-display area. The data pads DP are electrically connected to the data lines DL, and are electrically connected to the data channels of the data-driving circuit DDC.

Although not shown in FIG. 2, gate pads for electrically connecting the gate lines GL to the gate-driving circuit GDC may also be formed in the non-display area of the display panel 110.

As shown in FIG. 3, in the display panel 110 according to the aspect of the present disclosure, a plurality of touch electrodes TE and a plurality of touch lines TL are disposed in order to perform the touch driving. The plurality of touch lines TL transfer signals between the touch electrodes TE and the touch-driving circuit TDC.

In order to electrically connect the touch lines TL to the touch-driving circuit TDC, a plurality of touch pads TP, the number of which is the same as the number of touch lines, is disposed in the non-display area of the display panel 110.

The lines formed in the non-display area in order to connect the data pads DP to the data lines DL are referred to as data link lines, and the lines formed in the non-display area in order to connect the touch pads TP to the touch lines TL are referred to as touch link lines.

As shown in FIGS. 2 and 3, the data lines DL and the touch lines TL are disposed in the same direction, and the data pads DP and the touch pads TP are disposed in the same side of the non-display area of the display panel 110.

Figure 4:
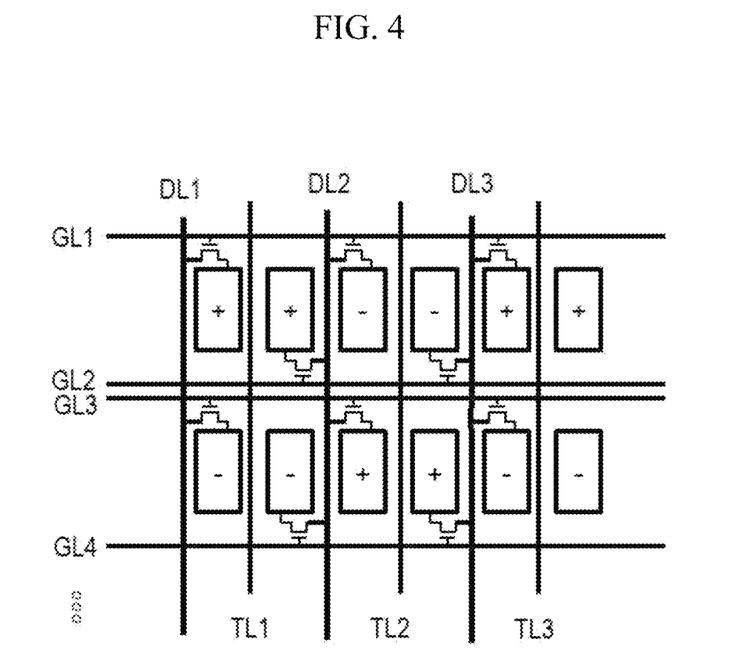
FIG. 4 is a configuration diagram of a display panel having a double rate driving (DRD) structure according to an aspect of the present disclosure.

FIG. 4 is a configuration diagram of a double rate driving (DRD) structure according to an aspect of the present disclosure.

As shown in FIG. 4, when the display panel has a DRD structure, adjacent pairs of pixels in the horizontal direction are connected to one of the data lines DL1, DL2 and DL3, and are connected to different ones of the gate lines GL1, GL2, GL3 and GL4. Further, the pixels arranged in the horizontal direction and connected to the same gate line are connected to different data lines. Furthermore, the pixels arranged in the vertical direction are connected to the same data line. When one of two pixels that are adjacent to each other in the horizontal direction is connected to an odd-numbered gate line, the other one thereof is connected to an even-numbered gate line, or when one of two pixels that are adjacent to each other in the horizontal direction is connected to an even-numbered gate line, the other one thereof is connected to an odd-numbered gate line.

In this DRD structure, one of touch lines TL1, TL2 and TL3 is disposed between two pixels that are adjacent to each other in the horizontal direction and are connected to different data lines.

That is, as shown in FIG. 4, the data lines DL1, DL2 and DL3 and the touch lines TL1, TL2 and TL3 are arranged parallel to each other in the same direction.

Figure 5:
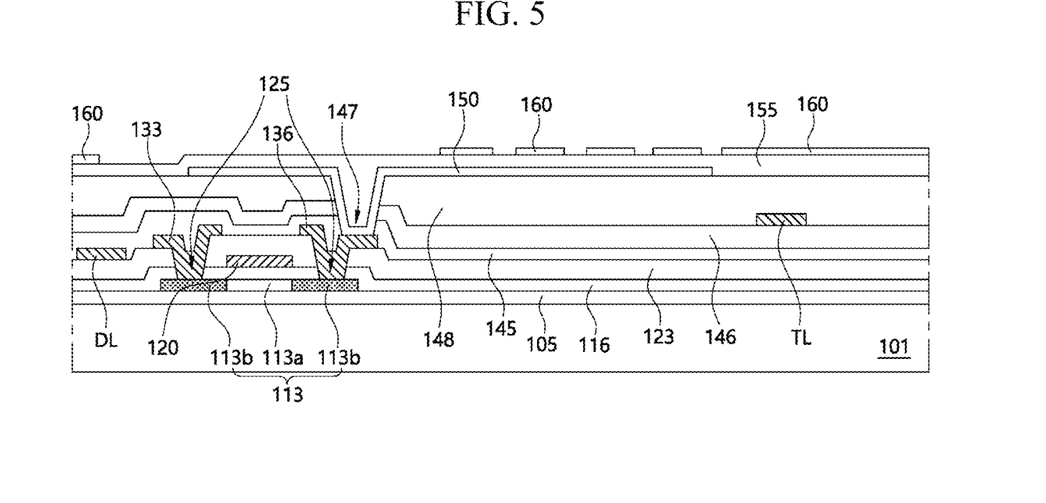
FIG. 5 is a cross-sectional view of one subpixel SP including a portion in which a thin-film transistor as a switching element is formed in an array substrate for the in-cell touch-type display panel according to the aspect of the present disclosure.

FIG. 5 is a cross-sectional view of one subpixel SP including a portion in which a thin-film transistor (TFT) as a switching element is formed in the array substrate for the in-cell touch-type display panel according to the aspect of the present disclosure. A TFT array substrate of an in-cell touch-type liquid crystal display panel is illustrated by way of example in FIG. 5. However, the in-cell touch-type display panel according to the aspect of the present disclosure is not necessarily limited to a liquid crystal display panel, and may be applied to an OLED display panel.

As shown in FIG. 5, the TFT array substrate of the in-cell touch-type liquid crystal display panel according to the present disclosure is configured such that a buffer layer 105, which is formed of an inorganic insulating material such as silicon oxide (SiO2) or silicon nitride (SiNx), is formed on a transparent substrate 101. In this case, when the transparent substrate 101 is formed of glass, during a high-temperature process of 500° C. or higher, a semiconductor layer 113 may be affected by alkali ions from the glass substrate 101, which may negatively affect the operation of the thin-film transistor Tr. In order to prevent this, the buffer layer 105 may be formed.

Although not shown in the drawings, before the formation of the buffer layer 105, a light-blocking layer may be further formed using a metal layer in a portion corresponding to the thin-film transistor Tr.

A semiconductor layer 113 is formed on the buffer layer 105 in the region of each subpixel SP in which the thin-film transistor is formed. The semiconductor layer 113 includes a first semiconductor region 113a, which is formed of low-temperature polycrystalline silicon and has a channel formed in the center thereof, and second semiconductor regions 113b formed by doping a high concentration impurity on both sides of the first semiconductor region 113a.

A gate insulating film 116 made of an inorganic insulating material is formed on the entire surface of the transparent substrate 101 including the semiconductor layer 113.

Gate lines (not shown, refer to GL1, GL2, GL3 and GL4 in FIG. 4) are formed on the gate insulating film 116. The gate lines are made of one or two or more metal materials selected from among aluminum (Al), an aluminum-neodymium alloy (AlNd), copper (Cu), a copper alloy, molybdenum (Mo), and molybdenum-titanium (MoTi), and have a single-layered or multi-layered structure. The gate lines are connected to each other at the boundaries between the subpixels SP, and extend in one direction.

In this case, a gate electrode 120 is formed on the portion of the gate insulating film 116 that corresponds to the first semiconductor region 113a. The gate electrode 120 is formed in the same structure using the same material as the gate lines (not shown). The gate electrode 120 protrudes from the gate lines (not shown).

An interlayer insulating film 123 made of an inorganic insulating material is formed on the entire surface of the substrate 101 including the gate electrode 120 and the gate lines (not shown, refer to GL1, GL2, GL3 and GL4 in FIG. 4). Here, semiconductor layer contact holes 125 are formed in the interlayer insulating film 123 and the gate insulating film 116 located thereunder in order to expose the second semiconductor regions 113b located on opposite sides of the first semiconductor region 113a.

Data lines DL and source and drain electrodes 133 and 136 are formed on the interlayer insulating film 123 including the semiconductor layer contact holes 125. The data lines DL and the source and drain electrodes 133 and 136 are made of one or two or more metal materials selected from among aluminum (Al), an aluminum-neodymium alloy (AlNd), copper (Cu), a copper alloy, molybdenum (Mo), and molybdenum-titanium (MoTi), and have a single-layered or multi-layered structure. The data lines DL are disposed in a direction perpendicular to the gate lines (not shown) so as to define the subpixels SP.

When the data lines DL have a multi-layered structure, each of them may have a triple-layered structure, including a first layer made of molybdenum (Mo) or molybdenum-titanium (MoTi), a second layer made of one selected from among aluminum (Al), an aluminum-neodymium alloy (AlNd), copper (Cu), and a copper alloy, and a third layer made of molybdenum (Mo) or molybdenum-titanium (MoTi). Data lines DL having a single-layered structure are illustrated by way of example in the drawings.

The source and drain electrodes 133 and 136 are located on the portion of the interlayer insulating film 123 that corresponds to the region in which the thin-film transistor is formed, and are in contact with the second semiconductor regions 113b, which are exposed through the semiconductor layer contact holes 125. The source and drain electrodes 133 and 136 are formed in the same structure using the same material as the data lines DL, and are spaced apart from each other. The source electrode 133 is electrically connected to the data lines DL.

The semiconductor layer 113, the gate insulating film 116, the gate electrode 120, the interlayer insulating film 123, and the source and drain electrodes 133 and 136, which are sequentially stacked, constitute the thin-film transistor, which is the switching element.

As shown in FIG. 4, the thin-film transistor is electrically connected to each of the gate lines GL1, GL2, GL3 and GL4 and each of the data lines DL1, DL2 and DL3. That is, the gate electrode 120 is connected to one of the gate lines GL1, GL2, GL3 and GL4, and the source electrode 133 is connected to one of the data lines DL1, DL2 and DL3.

First and second protective layers 145 and 146 are formed on the entire surface of the substrate including the data lines DL and the source and drain electrodes 133 and 136. The first and second protective layers 145 and 146 are made of an inorganic insulating material or an organic insulating material, and have flat surfaces.

Touch lines TL are formed on the second protective layer 146. The touch lines TL are disposed in a direction parallel to the data lines DL (refer to FIG. 4).

A third protective layer 148 is formed on the second protective layer 146 including the touch lines TL.

A drain contact hole 147 is formed in the first to third protective layers 145, 146 and 148 in order to expose the drain electrode 136 of the thin-film transistor.

A pixel electrode 150 is formed on the portion of the third protective layer 148 that corresponds to the subpixel area. The pixel electrode 150 is made of a transparent conductive material such as indium-tin-oxide (ITO) or indium-zinc-oxide (IZO), and is electrically connected to the drain electrode 136 through the drain contact hole 147. When a driving voltage is applied thereto, the pixel electrode 150 generates a fringe field together with a common electrode 160 to be formed later.

A fourth protective layer 155 is formed on the entire surface of the substrate including the pixel electrode 150. The fourth protective layer 155 is made of an inorganic insulating material such as silicon oxide (SiO2) or silicon nitride (SiNx).

A common electrode 160 is formed on the fourth protective layer 155. The common electrode 160 has a plurality of openings in the region thereof that overlaps the pixel electrode 150, and is formed over a plurality of subpixel areas to constitute one touch electrode (refer to TE in FIG. 3).

Although not shown in FIG. 5, as shown in FIG. 3, touch contact holes (not shown) are formed in the third and fourth protective layers 148 and 155 in order to expose the touch lines TL. The common electrode 160 is electrically connected to the touch lines TL through the touch contact holes (not shown).

It is illustrated in FIG. 5 that the pixel electrode 150 is formed on the third protective layer 148 and the common electrode 160 is formed on the fourth protective layer 155. However, the present disclosure is not limited thereto. The position of the pixel electrode 150 and the position of the common electrode 160 may be interchanged.

That is, the touch contact holes (not shown) may be formed in the third protective layer 148 in order to expose the touch lines TL, the common electrode 160 may be formed on the third protective layer 148 so as to be connected to the touch lines TL through the touch contact holes, and the fourth protective layer 155 may be formed on the entire surface of the substrate including the common electrode 160.

A drain contact hole 147 is formed in the first to fourth protective layers 145, 146, 148 and 155 in order to expose the drain electrode 136 of the thin-film transistor.

A pixel electrode 150 may be formed on the fourth protective layer 155 so as to be electrically connected to the drain electrode 136 through the drain contact hole 147. In this case, the pixel electrode 150 may have therein a plurality of openings.

Figure 6:
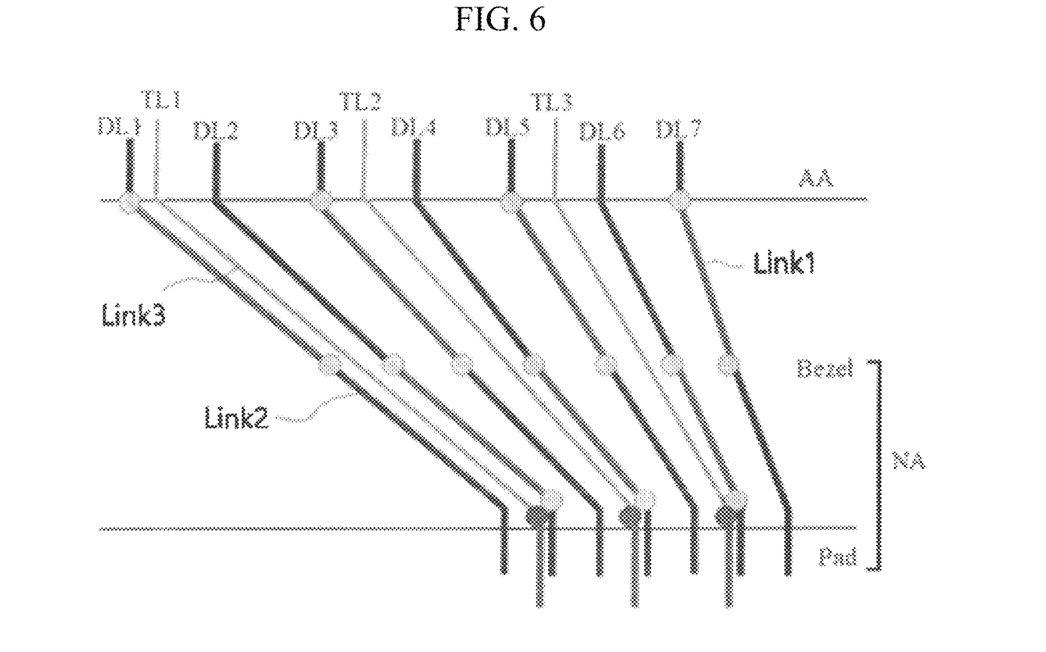
FIG. 6 is a plan view of data link lines or touch link lines according to a first aspect of the present disclosure.

FIG. 6 is a plan view of data link lines or touch link lines according to a first aspect of the present disclosure.

The array substrate 101 of the liquid crystal display panel is divided into a display area AA and a non-display area NA, and the non-display area NA is divided into a bezel area (Bezel) and a pad area (Pad). The display area AA is an area in which the TFT array substrate 101 and the color filter array substrate are bonded to display an image, and the non-display area NA is an area in which an image is not displayed. The bezel area (Bezel) is an area that is adjacent to the display area AA and is covered by the color filter array substrate, and the pad area (Pad) is an area that is not covered by the color filter array substrate.

As described with reference to FIG. 5, the data lines DL and the touch lines TL are formed in different layers from each other in the display area AA. In the pad area (Pad), the data pads of the data lines DL are formed of the same material as the data lines, and the touch pads of the touch lines TL are formed of the same material as the gate lines.

The data link lines disposed in the bezel area (Bezel) are formed of the same material as the data lines and/or the gate lines, and the touch link lines are formed of the same material as the touch lines.

This will be described below in more detail.

Figure 7:
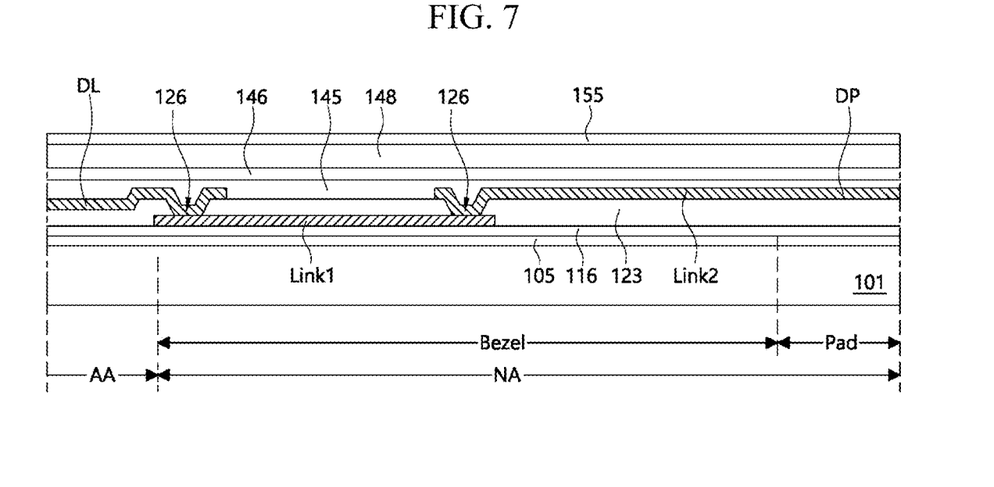
FIG. 7 is a cross-sectional view taken along, a data link line and a data pad, which are electrically connected to an odd-numbered data line according to the present disclosure.
Figure 8:
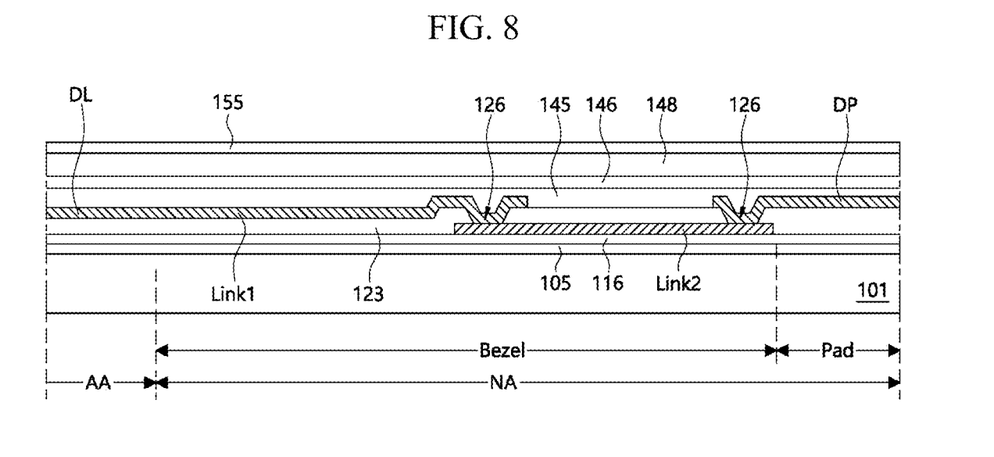
FIG. 8 is a cross-sectional view taken along, a data link line and a data pad, which are electrically connected to an even-numbered data line according to the present disclosure.
Figure 9:
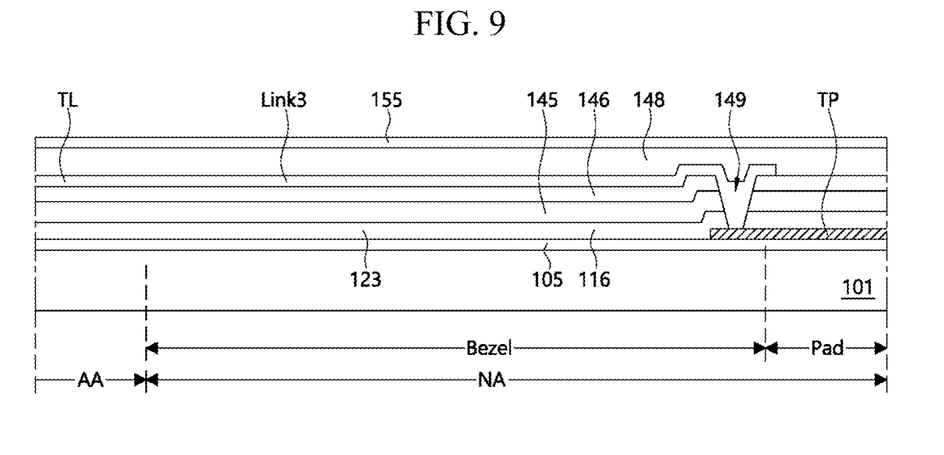
FIG. 9 is a cross-sectional view taken along a touch line, a touch link line, and a touch pad according to the present disclosure.

FIG. 7 is a cross-sectional view taken along, a an odd-numbered data link line and a data pad which are electrically connected to an odd-numbered data line DL1, DL3, DL5 and DL7, according to the present disclosure, FIG. 8 is a cross-sectional view taken along, a an even-numbered data link line and a data pad which are electrically connected to an even-numbered data line DL2, DL4 and DL6, according to the present disclosure, and FIG. 9 is a cross-sectional view taken along a touch line, a touch link line, and a touch pad according to the present disclosure.

For convenience of description, a portion of each data link line that is adjacent to the display area is referred to as a first link line (Link1), and a portion of each data link line that is adjacent to the pad area is referred to as a second link line (Link2). The touch link line is referred to as a third link line (Link3).

First, a data link line and a data pad, which are electrically connected to an odd-numbered data line DL1, DL3, DL5 and DL7 according to the present disclosure will now be described.

As shown in FIGS. 6 and 7, a buffer layer 105, which is made of an inorganic insulating material such as silicon oxide (SiO2) or silicon nitride (SiNx), and a gate insulating film 116, which is made of an inorganic insulating material, are sequentially stacked on the entire surface of a transparent substrate 101, which is divided into a display area AA, a bezel area (Bezel), and a pad area (Pad).

Subsequently, a first link line (Link1) of the data link lines is formed on the gate insulating film 116 in the bezel area (Bezel) using the same material as the gate lines.

An interlayer insulating film 123, which is made of an inorganic insulating material, is formed on the entire surface of the gate insulating film 116 including the first link line (Link1). First contact holes 126 are formed in the interlayer insulating film 123 in order to expose opposite end regions of the first link line (Link1).

Subsequently, a data line DL is formed on the interlayer insulating film 123 in the display area AA, and a second link line (Link2) of the data link lines and a data pad DP are formed of the same material as the data line DL on the interlayer insulating film 123 in each of the bezel area (Bezel) and the pad area (Pad).

The data line DL and the second link line (Link2) are electrically connected to the first link line (Link1) through the first contact holes 126. The second link line (Link2) and the data pad DP are integrally formed of the same material as the data line DL.

First to fourth protective layers 145, 146, 148 and 155 are sequentially stacked on the interlayer insulating film 123 including the data line DL, the second link line (Link2), and the data pad DP.

Now, a data link line and a data pad, which are electrically connected to an even-numbered data line DL2, DL4 and DL6 according to the present disclosure will be described.

As shown in FIGS. 6 and 8, a buffer layer 105, which is made of an inorganic insulating material such as silicon oxide (SiO2) or silicon nitride (SiNx), and a gate insulating film 116, which is made of an inorganic insulating material, are sequentially stacked on the entire surface of a transparent substrate 101, which is divided into a display area AA, a bezel area (Bezel), and a pad area (Pad).

Subsequently, a second link line (Link2) of the data link lines is formed of the same material as the gate lines on the gate insulating film 116 in the bezel area (Bezel).

An interlayer insulating film 123, which is made of an inorganic insulating material, is formed on the entire surface of the gate insulating film 116 including the second link line (Link2). First contact holes 126 are formed in the interlayer insulating film 123 in order to expose opposite end regions of the second link line (Link2).

Subsequently, a data line DL is formed on the interlayer insulating film 123 in the display area AA, and a first link line (Link1) of the data link lines and a data pad DP are formed of the same material as the data line DL on the interlayer insulating film 123 in each of the bezel area (Bezel) and the pad area (Pad).

The first link line (Link1) and the data pad DP are electrically connected to the second link line (Link2) through the first contact holes 126. The data line DL and the first link line (Link1) are integrally formed.

First to fourth protective layers 145, 146, 148 and 155 are sequentially stacked on the interlayer insulating film 123 including the data line DL, the first link line (Link1), and the data pad DP.

Now, a touch line, a touch link line, and a touch pad according to the present disclosure will be described.

As shown in FIGS. 6 and 9, a buffer layer 105, which is made of an inorganic insulating material such as silicon oxide (SiO2) or silicon nitride (SiNx), and a gate insulating film 116, which is made of an inorganic insulating material, are sequentially stacked on the entire surface of a transparent substrate 101, which is divided into a display area AA, a bezel area (Bezel), and a pad area (Pad).

Subsequently, a touch pad TP is formed of the same material as a gate line on the gate insulating film 116 in the pad area (Pad).

An interlayer insulating film 123, which is made of an inorganic insulating material, and first and second protective layers 145 and 146 are sequentially formed on the entire surface of the gate insulating film 116 including the touch pad TP. A second contact hole 149 is formed in the interlayer insulating film 123 and the first and second protective layers 145 and 146 in order to expose one end region of the touch pad TP.

Subsequently, a touch line TL and a third link line (Link3) are formed on the second protective layer 146 in each of the display area AA and the bezel area (Bezel).

The third link line (Link3) is electrically connected to the touch pad TP through the second contact hole 149. The touch line TL and the third link line (Link3) are integrally formed.

A third protective layer 148 and a fourth protective layer 155 are sequentially stacked on the second protective layer 146 including the touch line TL and the third link line (Link3).

It is illustrated in FIGS. 6 to 9 that portions of the touch link line and the data link line do not overlap each other. However, the present disclosure is not limited thereto. When the data pad and the touch pad are disposed in separate areas, the data link line, which connects the data line formed in the display area to the data pad formed in the pad area, and the touch link line, which connects the touch line formed in the display area to the touch pad formed in the pad area, may partially overlap each other.

In the in-cell touch-type display panel according to the present disclosure, as shown in FIGS. 7 and 8, the first link line (Link1) of each of the odd-numbered data link lines which are electrically connected to the odd-numbered data line and are disposed in the bezel area is formed of the same material as the gate line, and the first link line (Link1) of each of the even-numbered data link lines which are electrically connected to the even-numbered data line and are disposed in the bezel area is formed of the same material as the data line. In addition, the second link line (Link2) of each of the odd-numbered data link lines which are electrically connected to the odd-numbered data line and are disposed in the bezel area is formed of the same material as the data line, and the second link line (Link2) of each of the even-numbered data link lines which are electrically connected to the even-numbered data line and are disposed in the bezel area is formed of the same material as the gate line.

As described above, the first link lines (Link1) of the odd-numbered data link lines and the first link lines (Link1) of the even-numbered data link lines are formed in respectively different layers using respectively different materials, and the second link lines (Link2) of the odd-numbered data link lines and the second link lines (Link2) of the even-numbered data link lines are formed in respectively different layers using respectively different materials. Thus, it is possible to reduce the pitch between adjacent ones of the data link lines to half that of the conventional art.

As a result, it is possible to minimize the size of the bezel of the in-cell touch-type display panel and to secure price competitiveness through improvement of a process of chamfering a glass substrate, which is of the same model as that of the conventional art, without a separate process.

As is apparent from the above description, the in-cell touch-type display panel according to the present disclosure having the above-described characteristics has the following effects.

Link lines are formed in the same layer as gate lines in a pad area using the same material as the gate lines, and floating lines are formed on an interlayer insulating film in the pad area using the same material as data lines or touch lines. Thus, even when the in-cell touch-type display panel is manufactured through eight mask processes by omitting some of insulating layers, it is possible to prevent the occurrence of electrical disconnection of the link lines attributable to scratching.

In the conventional art, when the in-cell touch-type display panel is manufactured through eight mask processes, because only a first protective film and a second protective film are present on link lines in a pad area, the thicknesses of the protective films on the link lines are reduced, whereby electrical disconnection of the link lines may occur due to scratching.

However, according to the present disclosure, the link lines are formed in the same layer as the gate lines in the pad area using the same material as the gate lines, and the floating lines are formed on the interlayer insulating film in the pad area using the same material as the data lines or the touch lines. Thus, in addition to first and second protective films, the interlayer insulating film and a data line material are further formed on the link lines in the pad area. Accordingly, according to the present disclosure, the thicknesses of the protective films on the link lines are increased. As a result, even when the in-cell touch-type display panel is manufactured through eight mask processes, it is possible to prevent the occurrence of electrical disconnection of the link lines attributable to scratching.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:
1. An in-cell touch-type display panel comprising:
a first substrate divided into a display area, a bezel area, and a pad area;
gate lines, data lines and touch lines disposed in the display area, the gate lines, the data lines and the touch lines being disposed on different layers;
data pads and touch pads disposed in the pad area; and data link lines in the bezel area, the data link lines including odd-numbered data link lines connecting odd-numbered data lines to the data pads and even-numbered data link links connecting the even-numbered data lines to the data pads, wherein each of the odd-numbered data link lines and the even-numbered data link lines comprise a first link line disposed close to the display area and a second link line disposed close to the pad area, wherein the first link line of each of the odd-numbered data link lines is formed of a same material as the gate lines;

wherein the second link line of each of the odd-numbered data link lines is formed of a same material as the data lines;

wherein the first link line of each of the even-numbered data link lines is formed of the same material as the data lines; and wherein the second link line of each of the even-numbered data link lines is formed of the same material as the gate lines.

2. The in-cell touch-type display panel according to claim 1, further comprising:

third link lines disposed in the bezel area, the touch lines being electrically connected to the touch pad by the third link lines, wherein the third link lines are formed of a same material as the touch lines.

3. The in-cell touch-type display panel according to claim 1, wherein the data pads are disposed on a same layer as the data lines and formed of the same material as the data lines.

4. The in-cell touch-type display panel according to claim 1, wherein the touch pads are disposed on a same layer as the gate lines and formed of the same material as the gate lines.

5. The in-cell touch-type display panel according to claim 1, wherein each of the odd-numbered data lines and the second link line of the odd-numbered data link lines is electrically connected to the first link line of a corresponding odd-numbered data link line through a contact hole, and wherein the second link line of each of the even-numbered data link lines is electrically connected to a corresponding data pad and the first link line of a corresponding even-numbered data link line through a contact hole.

6. The in-cell touch-type display panel according to claim 5, wherein the second link line of the odd-numbered data link lines and the data pad are integrally formed, and the first link line of the even-numbered data link lines and the data line are integrally formed.

7. An in-cell touch-type display panel comprising:

a first substrate where a display area, a bezel area and a pad area are defined;

gate lines, data lines and touch lines disposed in the display area, the gate lines, the data lines and the touch lines being disposed on different layers;

data pads and touch pads disposed in the pad area; and data link lines in the bezel area, each of the data link lines including a first link line disposed close to the display area and a second link line disposed close to the pad area, wherein the first link lines of the odd-numbered data link lines which are connected to the odd-numbered data lines are disposed on a layer different from the first link lines of the even-numbered data link lines which are connected to the even-numbered data lines, wherein the second link line of the odd-numbered data link lines are disposed on a layer different from the second link lines of the even-numbered data link lines, and wherein the touch lines are connected to the touch pads by third link lines formed of a same material as the touch lines.

8. The in-cell touch-type display panel according to claim 7, wherein the data pad are disposed on a same layer as the data lines and formed of the same material as the data lines.

9. The in-cell touch-type display panel according to claim 7, wherein the touch pad are disposed on a same layer as the gate lines and formed of the same material as the gate lines.

10. The in-cell touch-type display panel according to claim 7, wherein each of the odd-numbered data lines and the second link lines of the odd-numbered data link lines is electrically connected to the first link line of a corresponding odd-numbered data link line through a contact hole.

11. The in-cell touch-type display panel according to claim 7, wherein the second link line of each of the even-numbered data link lines is electrically connected to a corresponding data pad and the first link line of a corresponding even-numbered data link line through a contact hole.

12. The in-cell touch-type display panel according to claim 7, wherein the second link line of each of the odd-numbered data link lines is integrally formed with a corresponding data pad.

13. The in-cell touch-type display panel according to claim 7, wherein the first link line of each of the even-numbered data link lines is integrally formed with a corresponding even-numbered data line.

* * * * *